(12) United States Patent
Mountain

(10) Patent No.: US 8,739,222 B2
(45) Date of Patent: *May 27, 2014

(54) ALTERATION OF ELECTRONIC PROGRAM GUIDE DATA BASED ON RATINGS LOCK

(71) Applicant: Eldon Technology Limited, Steeton (GB)

(72) Inventor: Dale Llewelyn Mountain, Silsden (GB)

(73) Assignee: Eldon Technology Limited, Steeton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,517

(22) Filed: Oct. 19, 2012

(65) Prior Publication Data

US 2013/0047185 A1    Feb. 21, 2013

Related U.S. Application Data

(63) Continuation of application No. 12/510,851, filed on Jul. 28, 2009, now Pat. No. 8,327,401.

(51) Int. Cl.
*H04N 7/16* (2011.01)
*G06F 3/00* (2006.01)
*G06F 13/00* (2006.01)
*H04N 5/445* (2011.01)

(52) U.S. Cl.
USPC .................. 725/47; 725/28; 725/46

(58) Field of Classification Search
USPC ........... 725/25, 27, 28, 29, 30, 31, 37, 39, 46, 725/47
See application file for complete search history.

(56) References Cited

U.S. PATENT DOCUMENTS

| 6,481,011 B1 | 11/2002 | Lemmons |
| 6,785,901 B1 | 8/2004 | Horiwitz et al. |
| 2003/0070166 A1* | 4/2003 | Johnson .......................... 725/28 |
| 2006/0031872 A1 | 2/2006 | Hsiao et al. |

* cited by examiner

*Primary Examiner* — John Schnurr
(74) *Attorney, Agent, or Firm* — Ingrassia Fisher & Lorenz, P.C.

(57) ABSTRACT

A television receiver receives a programming signal including programming content and EPG data. The television receiver receives a request for an EPG display. The television receiver modifies the EPG data for one or more records in the EPG data which include content ratings that exceed a ratings lock setting of the television receiver. The television receiver may modify the EPG data for one or more records in a variety of different manners depending on a variety of different factors associated with the records. The television receiver then generates the EPG display from the modified EPG data and transmits the generated EPG display to a display device. The modification of the EPG data may prevent display of objectionable content in the EPG display and/or may indicate that the records correspond to blocked programs.

9 Claims, 6 Drawing Sheets

| | 6:00 PM | 6:30 PM | 7:00 PM |
|---|---|---|---|
| 1 | TITLE A¹  DESCRIPTION A¹  TV-MA | | TITLE B¹  DESCRIPTION B¹  TV-MA |
| 2 | TITLE C¹  DESCRIPTION C¹  TV-PG | | |
| 3 | TITLE D¹  DESCRIPTION D¹  TV-14 | TITLE E¹  DESCRIPTION E¹  TV-MA | TITLE F¹  DESCRIPTION F¹  TV-G |

300D

|   | 6:00 PM | 6:30 PM | 7:00 PM |
|---|---------|---------|---------|
| 1 | TITLE A¹ DESCRIPTION A¹ TV-MA | | TITLE B¹ DESCRIPTION B¹ TV-MA |
| 2 | TITLE C¹ DESCRIPTION C¹ TV-PG | | |
| 3 | TITLE D¹ DESCRIPTION D¹ TV-14 | TITLE E¹ DESCRIPTION E¹ TV-MA | TITLE F¹ DESCRIPTION F¹ TV-G |

FIG.3A  300A

|   | 6:00 PM | 6:30 PM | 7:00 PM |
|---|---------|---------|---------|
| 1 | | | |
| 2 | TITLE C¹ DESCRIPTION C¹ TV-PG | | |
| 3 | | | TITLE F¹ DESCRIPTION F¹ TV-G |

FIG.3B  300B

| | 6:00 PM | | | 6:30 PM | | 7:00 PM | |
|---|---|---|---|---|---|---|---|
| 1 | TITLE A¹ | DESCRIPTION A¹ | TV-MA | | | TITLE B¹ DESCRIPTION B¹ | TV-MA |
| 2 | TITLE C¹ | DESCRIPTION C¹ | TV-PG | | | | |
| 3 | TITLE D¹ | DESCRIPTION D¹ | TV-14 | TITLE E¹ DESCRIPTION E¹ | TV-MA | TITLE F¹ DESCRIPTION F¹ | TV-G |

FIG. 3E  300E

| | 6:00 PM | | | 6:30 PM | | 7:00 PM | |
|---|---|---|---|---|---|---|---|
| 1 | TITLE A¹ | DESCRIPTION A¹ | TV-MA | | | | |
| 2 | TITLE C¹ | DESCRIPTION C¹ | TV-PG | | | | |
| 3 | TITLE D¹ | DESCRIPTION D¹ | TV-14 | TITLE E¹ DESCRIPTION E¹ | TV-MA | TITLE F¹ DESCRIPTION F¹ | TV-G |

FIG. 3F  300F

| | 6:00 PM | 6:30 PM | 7:00 PM |
|---|---|---|---|
| 1 | | | |
| 2 | TITLE C¹ DESCRIPTION C¹ TV-PG | | TITLE F¹ DESCRIPTION F¹ TV-G |
| 3 | TITLE D¹ DESCRIPTION D¹ TV-14 | | |

FIG.3G 300G

| | 6:00 PM | 6:30 PM | 7:00 PM |
|---|---|---|---|
| 1 | | | |
| 2 | TITLE C¹ DESCRIPTION C¹ TV-PG | | TITLE F¹ DESCRIPTION F¹ TV-G |
| 3 | TITLE D¹ DESCRIPTION D¹ TV-14 | TITLE E¹ DESCRIPTION E¹ TV-MA | |

FIG.3H 300H

ALTERATION OF ELECTRONIC PROGRAM GUIDE DATA BASED ON RATINGS LOCK

CROSS-REFERENCE TO RELATED APPLICATIONS

This application is a Continuation of U.S. patent application Ser. No. 12/510,851, filed on Jul. 28, 2009, and now issued as U.S. Pat. No. 8,327,401.

FIELD OF THE INVENTION

This invention relates generally to electronic program guides, and more specifically to alteration of electronic program guide data based on ratings lock.

BACKGROUND

Conventional television receivers, such as set top boxes, cable boxes, digital video receivers and so on, receive a programming signals from programming providers, such as satellite or cable television providers. These television receivers process the programming signals and transmit programming from the programming signal to a display device, such as a television. Some conventional television receivers include the capability to block programming that may be objectionable to users. Such television receivers may include a ratings lock (one example of a ratings lock is a V-chip). The ratings lock may prevent the television receiver from passing programming to the display device if the programming has ratings that are prohibited by a ratings lock setting of the ratings lock.

Some conventional television receivers also include the capability to generate electronic program guide (EPG) displays. These EPG displays present information associated with programming content to aid users in navigating, selecting, and discovering programming content. Typically, users request EPG displays from the television receivers (such as via a remote control for a set top box). The television receivers then generates the EPG display from EPG data included in the received programming signal and transmits the EPG display to a display device.

SUMMARY

The present disclosure provides systems, methods, and apparatuses for enhancing electronic program guide (EPG) displays by altering EPG data based on ratings locks. A television receiver receives a programming signal that includes programming content and EPG data. The television receiver may process the programming signal and transmit the programming content to a display device. The television receiver may include a ratings lock, which may prevent transmission of programming if an associated rating exceeds a value of the ratings lock.

The EPG data typically includes a plurality of records. Each record may include information related to certain corresponding programming content, such as a content rating, air time, and/or a channel identifier. Each record may also include EPG display information that generally specifies how to display the record when generating an EPG display. The display information may include particular program information to display, a color in which to display the record, and/or an intensity for the record.

The television receiver may receive a request for an EPG display and, in response, may modify the EPG data for one or more records in the EPG data that have content ratings exceeding a ratings lock setting. Such modification may occur in a variety of different manners depending on a variety of different factors, providing flexibility in the alteration of EPG data.

The television receiver then generates the EPG display from the modified EPG data and transmits the generated EPG display to the display device. The modification of the EPG data prevents display of information in the one or more records in the EPG display and/or changes how the one or more records are displayed in the EPG display. In this way, the EPG display may provide enhanced functionality over EPG displays that do not modify EPG data based on content ratings.

Preventing display of information in one or more records may potentially prevent display of objectionable content. For example, a sexually graphic description of a program may be objectionable to a user and may be prevented from being displayed. Changing how one or more records are displayed may indicate that the records correspond to blocked programs. For example, displaying a record in red when other records are displayed in blue may indicate to a user that the red record corresponds to a program that cannot be viewed.

It is to be understood that both the foregoing general description and the following detailed description are exemplary and explanatory only and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 3A illustrates a sample electronic program guide that may be generated by the television receiver of FIG. 1;

FIG. 3B illustrates a sample electronic program guide with program information omitted for some records that may be generated by the television receiver of FIG. 1;

FIG. 3E illustrates a sample electronic program guide with the program information displayed in a strikethrough font for some records that may be generated by the television receiver of FIG. 1;

FIG. 3F illustrates a sample electronic program guide with the program information omitted for some records and some records colored differently than other records that may be generated by the television receiver of FIG. 1;

FIG. 3G illustrates a sample electronic program guide with some records colored differently than other records and the program information omitted for some records that may be generated by the television receiver of FIG. 1; and FIG. 3H illustrates a sample electronic program guide with the program information omitted for some records and some records colored differently than other records that may be generated by the television receiver of FIG. 1.

DETAILED DESCRIPTION OF THE EMBODIMENTS

The description that follows includes exemplary systems, methods, techniques, instruction sequences, and/or computer program products that embody techniques of the present disclosure. However, it is understood that the described disclosure may be practiced without these specific details. Reference will now be made in detail to the subject matter disclosed, which is illustrated in the accompanying drawings.

The present disclosure provides enhanced EPG displays by altering EPG data based on ratings locks. A television receiver may receive a request for an EPG display and may modify EPG data for one or more records that include content ratings exceeding a ratings lock setting. The modification may occur in a variety of different manners depending on a variety of different factors, providing flexibility. The television receiver may then generate the EPG display from the modified EPG data and transmit the generated EPG display to a display device.

Figure 1:
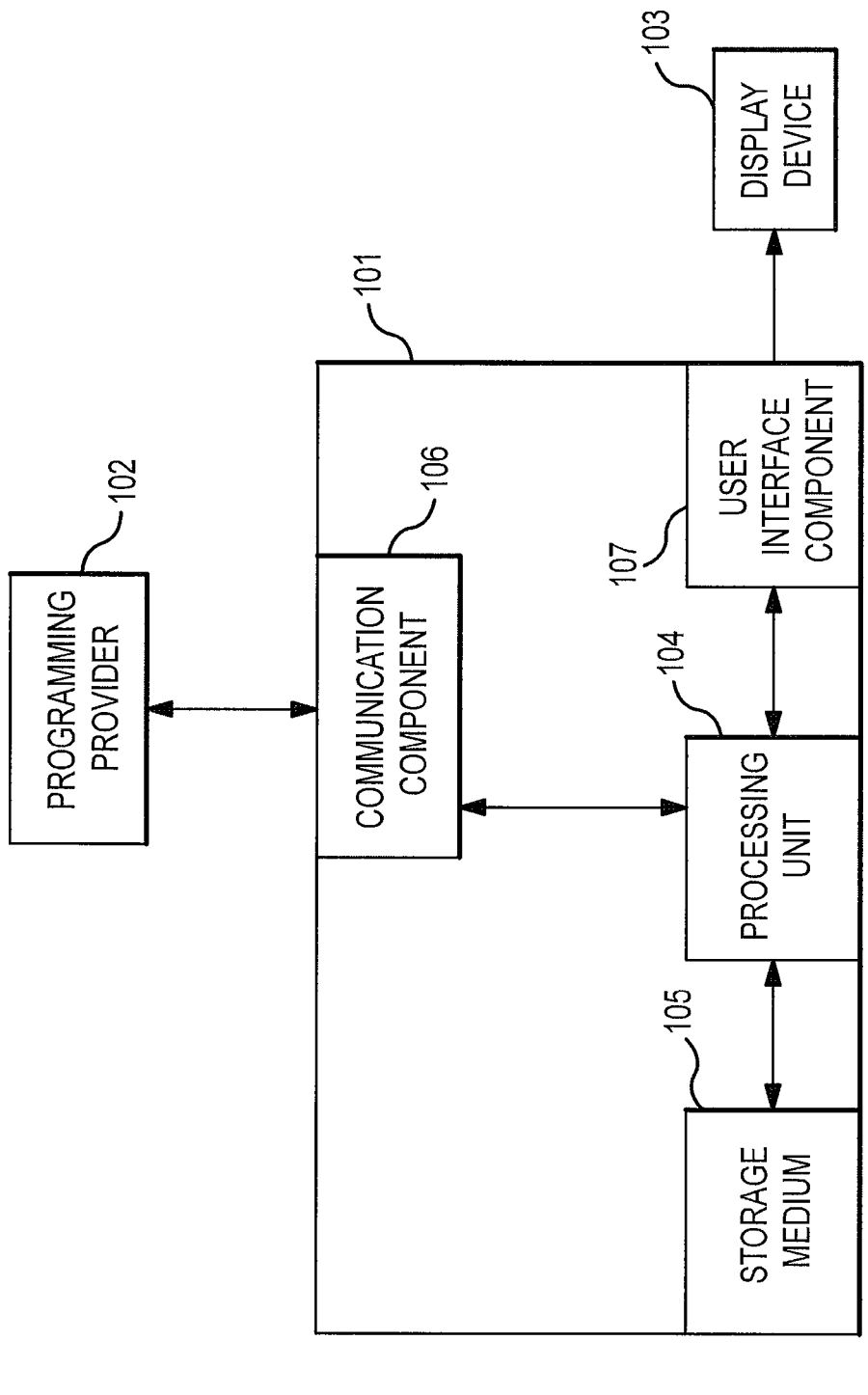
FIG. 1 is a block diagram illustrating a system for altering electronic program guide data based on a ratings lock, in accordance with an embodiment of the present disclosure.

FIG. 1 is a block diagram illustrating a system 100 for altering EPG data based on a ratings lock, in accordance with an embodiment of the present disclosure. System 100 includes television receiver 101, programming event provider 102, and display device 103. The television receiver 101 includes processing unit 104, storage medium 105, communication component 106, and user interface 107.

The programming provider 102 may transmit a programming signal to the system 101. The programming signal carries a plurality of programming content and EPG data, which in turn includes a plurality of records. Each record may include metadata, or information related to corresponding programming content. The plurality of programming content may be tagged with packet identifiers (PIDs), each PID specifying a channel identifier corresponding to the programming content.

The communication component 106 may receive the programming signal from the programming provider 102 via a communication path (not shown). Such a communication path may take the form of a satellite communication path, a cable communication path, a free-to-air communication path, a terrestrial television communication path, a network communication path, an Internet communication path, a radio communication path, a cellular communication path, a local area network communication path, a wide area network communication path, a wireless local area network communication path, a plain old telephone system communication path, and so on.

The television receiver 101 may take the form of, or be part of, a digital video recorder (DVR), a personal video recorder (PVR), or a set-top box as well as any other television or audio/video receiver. The processing unit 104 may be, but is not limited to, an integrated circuit device such as a controller. The user interface 107 may include, but is not limited to, one or more buttons, a wired or wireless signal receiver (such as an infrared, Bluetooth™, radio frequency, HomeLink™, or other signal receiver), one or more switches, a touch screen, a keyboard, a mouse, a track ball, a track pad, and/or a voice recognition receiver. The communication component 106 may include, but is not limited to, a tuner and/or network interface. The storage medium 105 may be any or all of: a magnetic storage medium (e.g., floppy diskette and hard disk drive), an optical storage medium (e.g., CD-RW, DVD-RW, and DVD-RAM); a magneto-optical storage medium, a random access memory (RAM); an erasable programmable memory (e.g., EPROM and/or EEPROM); a flash memory; or other type of medium suitable for storing information and/or instructions in a form readable by the processing unit 104. The programming event provider 102 be any of the following: television broadcasters; radio broadcasters; satellite providers; cable providers; network servers; Internet file servers; streaming content providers; or on demand content providers; and so on. The display device 103 may be a television, a cathode ray-tube display, a liquid crystal display, light emitting diodes, organic light emitting diodes, and/or a speaker, or any other suitable display device.

The processing unit 104 may process the received programming signal to store the EPG data in the storage medium 105 and determine whether to transmit one or more portions of the plurality of programming content to the display device 103. Such determination may include selecting programming content tagged with a PID that specifies a particular channel identifier. The processing unit 104 may also obtain a ratings lock setting from the storage medium 105, compare content ratings of programming content to the ratings lock setting, and transmit the programming content to the display device 103 only if the content rating is not blocked by the ratings lock setting.

The ratings lock setting may correspond to a ratings system such as the TV parental guidelines system, the motion picture ratings system, or a proprietary rating system utilized by the programming provider 102. For example, the TV parental guidelines system utilizes a ranked system of ratings including (listed from low to high) TV-Y, TV-Y7, TV-G, TV-PG, TV-14, TV-MA, or unrated. In this case, if the ratings lock setting is set to TV-G, the processing unit 104 may not transmit any programming content to the display device 103 if the rating of the programming is TV-PG, TV-14, TV-MA, or unrated.

Continuing this example, a user (such as a parent) may determine that programs rated TV-MA are objectionable. The user may prevent the television receiver from transmit such programs to the display device 103 by setting the ratings lock setting of the programming receiving and decoder 101 to block programs rated TV-MA.

Still with respect to FIG. 1, the user interface component 107 may receive a request for an EPG display. In response to the request, the processing unit 104 may generate the EPG display based on the EPG data, which may be retrieved from the storage medium 105, and transmit the generated EPG display to the display device 103. The EPG display may be rendered as a table including multiple records (such as the EPG display 300A illustrated in FIG. 3A), each record corresponding to a channel identifier and an air time associated with programming content, organized according to the channel identifiers and air times. Alternatively, the EPG display may be rendered as a banner of one or more records, organized according to air times associated with programming content displayed on the display device. The request for the EPG display may specify parameters identifying characteristics associated with records to include in the display, such as a range of channel identifiers and air times. Alternatively, the EPG display may be generated according to one or more default characteristics associated with the records, such as a default range of channel identifiers and air times including a channel currently being transmitted to the display device at the current time.

Referring again to FIG. 1, although the television receiver 101 and the display device 103 are illustrated in FIG. 1 as separate devices, they may be incorporated into a single device without departing from the scope of the present disclosure. For example, the television receiver 101 and the display device 103 may be incorporated into a cable-ready television.

Figure 2:
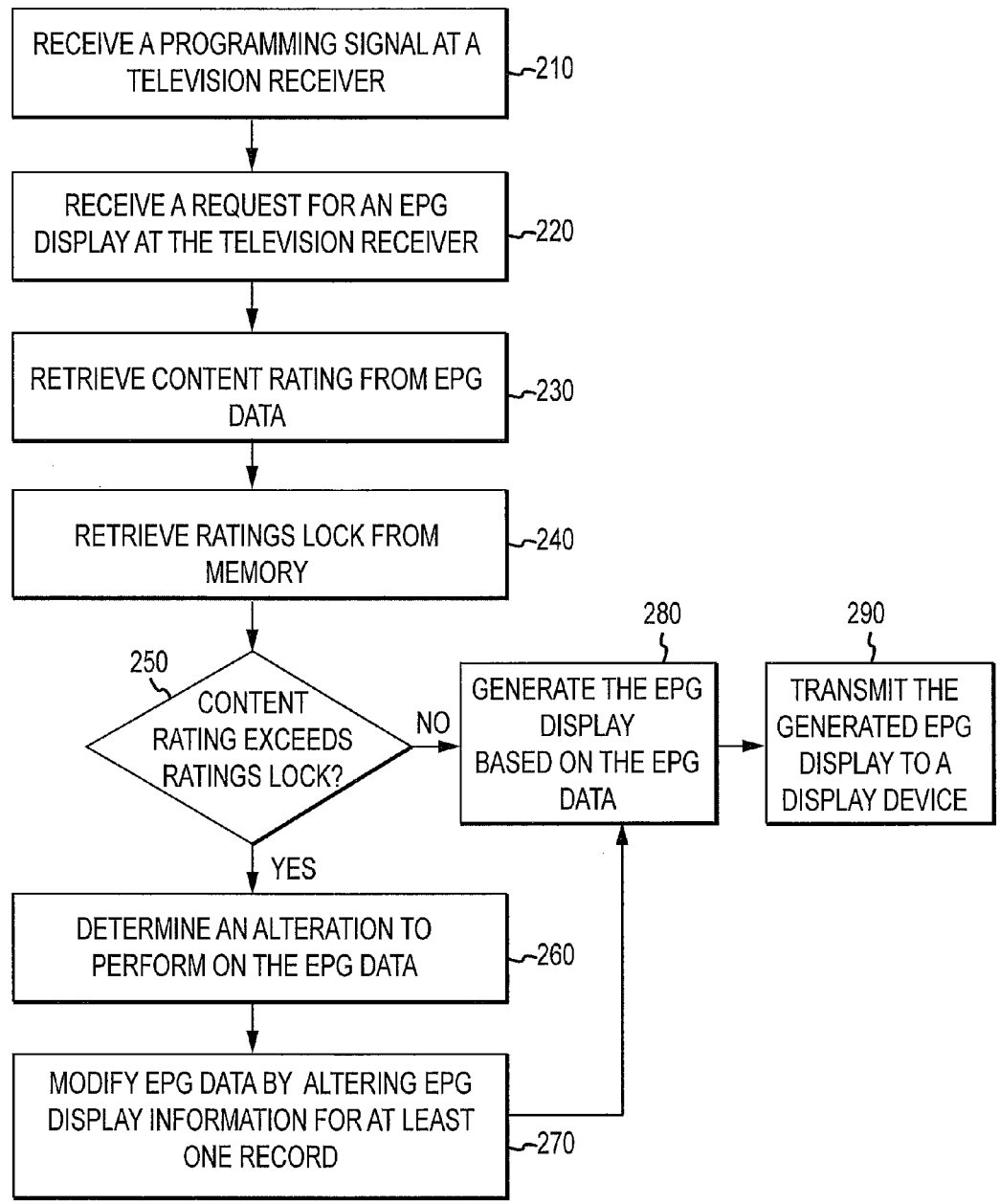
FIG. 2 is a method diagram illustrating a method of altering electronic program guide data which may be performed by the system of FIG. 1.

FIG. 2 is a flow chart illustrating a method 200 of which may be performed by the system 100 to alter EPG data. The system 100 may perform the method 200 by the processing unit 104 loading and executing one or more instructions embodied in a computer-readable and/or machine-readable medium, such as the storage medium 105 and/or another storage medium.

In operation 210, the television receiver 101 receives a programming signal that typically includes a plurality of programming content and EPG data. The EPG data may include a plurality of records, each record including a content rating and EPG display information.

In operation 220, the television receiver 101 receives a request for an EPG display. The request may include parameters identifying characteristics associated with records to indicate which records should be included in the EPG display and/or how the EPG display should be formatted. For example, the request may specify a range of channels identifiers and air times to indicate that records associated with the range of channel identifiers and air times should be included in the EPG display.

In operation 230, the processing unit 104 retrieves a content rating from the EPG data. In operation 240, the processing unit 104 retrieves a ratings lock setting from a memory.

In operation 250, the processing unit 104 compares the content rating to the ratings lock. If the content rating exceeds the ratings lock setting, flow proceeds to operation 260. If the content rating does not exceed the ratings lock setting, flow proceeds to operation 280.

In operation 260, the processing unit 104 determines an alteration to perform on the EPG data.

In an operation 270, the processing unit 104 modifies the EPG data by altering the EPG display information based on the determined alteration and the flow proceeds to operation 280. The processing unit 104 may record the modification to the EPG data in the storage medium 105.

The processing unit 104 may alter the EPG display information in a variety of different manners. The manner in which the processing unit alters the EPG display information may be determined by a setting of the television receiver 101 and may depend on various factors such as a current time, an air time, a content rating, and/or a channel identifier.

In operation 280, the processing unit 104 generates the EPG display based on the EPG data. The processing unit 104 may generate the EPG display based on the EPG data according to parameters specified in the request for the EPG display. The processing unit 104 may generate the EPG display based on records included in the EPG data that are associated with characteristics specified in the parameters. For example, the processing unit 104 may generate the EPG display based on records included in the EPG data that are associated with channel identifiers and air times specified in the parameters.

In an operation 290, the television receiver 101 transmits the generated EPG display to the display device 103. The display device 103 may receive and display the generated EPG display.

By way of example, the television receiver 101 may have received a programming signal including a plurality of programming content and EPG data. The EPG data includes 6 records. Each of the records has a content rating associated with the TV parental guidelines system, a channel identifier, and an air time. Each of the records also has EPG display information specifying how to display the record when generating an EPG display.

In this example, the first record has a content rating of TV-MA, a channel identifier of 1, and an air time of 6:00 PM to 7:00 PM. The first record also specifies a color in which to display the first record (such as white), an intensity for the first record, and program information of "Title $A^1$ Description $A^1$ TV-MA" to display for the first record. For the first record, Title $A^1$ is a title of programming event A and Description $A^1$ is a description of programming event A. The second record has a content rating of TV-MA, a channel identifier of 1, and an air time of 7:00 PM to 7:30 PM. The second record also specifies a color in which to display the second record (such as white), an intensity for the second record, and program information of "Title $B^1$ Description $B^1$ TV-MA" to display for the second record. For the second record, Title $B^1$ is a title of programming event B and Description $B^1$ is a description of programming event B. The third record has a content rating of TV-PG, a channel identifier of 2, and an air time of 6:00 PM to 7:30 PM. The third record also specifies a color in which to display the third record (such as white), an intensity for the third record, and program information of "Title $C^1$ Description $C^1$ TV-PG" to display for the third record. For the third record, Title $C^1$ is a title of programming event C and Description $C^1$ is a description of programming event C. The fourth record has a content rating of TV-14, a channel identifier of 3, and an air time of 6:00 PM to 6:30 PM. The fourth record also specifies a color in which to display the fourth record (such as white), an intensity for the fourth record, and program information of "Title $D^1$ Description $D^1$ TV-14" to display for the fourth record. For the fourth record, Title $D^1$ is a title of programming event D and Description $D^1$ is a description of programming event D. The fifth record has a content rating of TV-MA, a channel identifier of 3, and an air time of 6:30 PM to 7:00 PM. The fifth record also specifies a color in which to display the fifth record (such as white), an intensity for the fifth record, and program information of "Title $E^1$ Description $E^1$ TV-MA" to display for the fifth record. For the fifth record, Title $E^1$ is a title of programming event E and Description $E^1$ is a description of programming event E. The sixth record has a content rating of TV-G, a channel identifier of 3, and an air time of 7:00 PM to 7:30 PM. The sixth record also specifies a color in which to display the sixth record (such as white), an intensity for the sixth record, and program information of "Title $F^1$ Description $F^1$ TV-G" to display for the sixth record. For the sixth record, Title $F^1$ is a title of programming event F and Description $F^1$ is a description of programming event F.

The television receiver 101 may receive a request for an EPG display and generate the EPG display based on the EPG data that includes these six records. FIG. 3A illustrates a sample EPG display 300A generated by the television receiver 101 where the ratings lock setting of the television receiver 101 is set to a rating of TV-MA or above. As the ratings lock setting of the television receiver 101 is set to a rating of TV-MA or above, the television receiver 101 does not modify any of the six records when generating the EPG display 300A because the content ratings of the six records do not exceed the ratings lock setting of the television receiver 101.

However, if the ratings lock setting of the television receiver 101 were set to a rating of TV-PG, the television receiver 101 would modify the first, second, fourth, and fifth records when generating an EPG display because the content ratings of the first, second, fourth, and fifth records would exceed the ratings lock setting of the television receiver 101. In this case, the television receiver 101 may modify the first, second, fourth, and fifth records when generating an EPG display in a variety of manners. The variety of manners may include, but are not limited to, removing (or obscuring, such as formatting to display in a strikethrough font) the program information (or a portion thereof) to display for the records, changing the color in which to display the records, and/or changing the intensity (such as reducing the visual intensity to effect a dimming or fading) for the records. The manner that the television receiver 101 modifies the first, second, fourth, and fifth records may be determined by settings in the television receiver 101 and/or parameters specified in the request for the EPG display.

In the case where the television receiver 101 is set to remove program information for the records, the television receiver 101 modifies the first, second, fourth, and fifth records by removing the program information for the first, second, fourth, and fifth records. FIG. 3B illustrates a sample EPG display 300B generated by the television receiver 101 where the television receiver 101 has removed the programming information for the first, second, fourth, and fifth records. As shown, the display of the first, second, fourth, and fifth records does not include the programming information for the first, second, fourth, and fifth records.

Figure 3C:
FIG. 3C illustrates a sample electronic program guide with some records colored differently than other records that may be generated by the television receiver of FIG. 1.

In the case where the television receiver 101 is set to change the color in which to display the records, the television receiver 101 modifies the first, second, fourth, and fifth records by changing the color in which to display the first, second, fourth, and fifth records. FIG. 3C illustrates a sample EPG display 300C generated by the television receiver 101 where the television receiver 101 has changed the color in which to display the first, second, fourth, and fifth records. As shown, the first, second, fourth, and fifth records are displayed in grey. The third and sixth records, which were not modified, are displayed in white. It is understood that although the present case has been described utilizing the colors grey and white, any colors maybe utilized without departing from the scope of the present disclosure. For example, unmodified records may specify to display the records in green and modifying the records may change the color in which to display the records to red or yellow.

Figure 3D:
FIG. 3D illustrates a sample electronic program guide with the program information for some records faded that may be generated by the television receiver of FIG. 1.

In the case where the television receiver 101 is set to fade the intensity for the records, the television receiver 101 modifies the first, second, fourth, and fifth records by fading the intensity for the first, second, fourth, and fifth records. FIG. 3D illustrates a sample EPG display 300D generated by the television receiver 101 where the television receiver has faded the intensity for the first, second, fourth, and fifth records. As shown, the display of the first, second, fourth, and fifth records is faded as compared to the display of the third and sixth records.

In the case where the television receiver 101 is set to obscure program information for the records by formatting the programming information to display in a strikethrough font, the television receiver 101 modifies the first, second, fourth, and fifth records by formatting the programming information for the first, second, fourth, and fifth records to display in a strikethrough font. FIG. 3E illustrates a sample EPG display 300E generated by the television receiver 101 where the television receiver 101 has formatting the programming information for the first, second, fourth, and fifth records to display in a strikethrough font. As shown, the program information for the first, second, fourth, and fifth records are displayed in a strikethrough font and the programming information for the third and sixth records are not.

The television receiver 101 may be set to modify records that exceed the content rating in different manners depending on the current time when the EPG display is requested. For example, a user may set the television receiver 101 to remove program information for EPG displays requested before 5:00 pm (resulting in an EPG display similar to the sample EPG display 300B shown in FIG. 3B) and to change colors for EPG displays requested after 5:00 PM (resulting in an EPG display similar to the sample EPG display 300C shown in FIG. 3C). The user may set the television receiver 101 to modify records in these different manners because their children watch television unsupervised prior to 5:00 PM supervised after 5:00 PM.

The television receiver 101 may be set to modify records that exceed the content rating in different manners depending on the time that the program associated with the record will air. For example, a user may set the television receiver 101 to remove program information for records associated with programs that air after 7:00 pm and to change colors for records associated with programs that air before 7:00 PM. The user may set the television receiver 101 to modify records in these different manners because they determine that programs that air after 7:00 PM are more likely to contain objectionable content in their program descriptions than programs that air prior to 7:00 PM. FIG. 3F illustrates a sample EPG display 300F generated by the television receiver 101 where the television receiver 101 has removed the programming information for the second record (because it has an air time of 7:00 PM) and changed the color in which to display the first, fourth, and fifth records (because they have air times prior to 7:00 PM). As shown, the program information for the second record has been removed and the first, fourth, and fifth records are displayed in grey. The third and sixth records, which were not modified, are displayed in white.

The television receiver 101 may be set to modify records that exceed the content rating in different manners depending on the content ratings of the records. For example, a user may set the television receiver 101 to remove program information for records with content ratings in a range of content ratings between TV-MA and unrated and to change colors for records content ratings in a range of content ratings including TV-14. The user may set the television receiver 101 to modify records in these different manners because they determine that programs with TV-MA or unrated content ratings are more likely to contain objectionable content in their program descriptions than programs with content ratings of TV-14. FIG. 3G illustrates a sample EPG display 300G generated by the television receiver 101 where the television receiver 101 has removed the programming information for the first, second, and fifth records (because they have content ratings of TV-MA) and changed the color in which to display the fourth record (because it has a content rating of TV-14). As shown, the program information for the first, second, and fifth records have been removed and the fourth record is displayed in grey. The third and sixth records, which were not modified, are displayed in white.

The television receiver 101 may be set to modify records that exceed the content rating in different manners depending on channel identifiers associated with the records. For example, a user may set the television receiver 101 to remove program information for records with associated with channel identifiers in a set including channel 1 and to change colors for records associated with channel identifiers in a set including channels 2 and 3. The user may set the television receiver 101 to modify records in these different manners because they determine that programs associated with channel 1 are more likely to contain objectionable content in their program descriptions than programs associated with channels 2 and 3. For example, channel 1 may be oriented towards adult programming, such as SpikeTV™ and channels 2 and 3 may be oriented toward child or family programming, such as Nickelodeon™ or CBS™. FIG. 3H illustrates a sample EPG display 300H generated by the television receiver 101 where the television receiver 101 has removed the programming information for the first and second records (because they are associated with channel 1) and changed the color in which to display the fourth and fifth records (because they are associated with channel 3). As shown, the program information for the first and second records have been removed and the fourth and fifth record are displayed in grey. The third and sixth records, which were not modified, are displayed in white.

Although the above examples have been described as modifying EPG data in particular manners based on particular factors, it should be understood that EPG data may be modified in different manners and based on different factors than those discussed above (or by combining modifying EPG data in manners and based on factors discussed above) without departing from the present disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method, comprising:
   receiving a programming signal at a television receiver, the programming signal comprising a plurality of programming content and electronic program guide (EPG) data, the EPG data comprising a plurality of records, each record of the plurality of records comprising a content rating and EPG display information;
   receiving a request for an EPG display at the television receiver;
   retrieving a content rating of at least one record of the plurality of records from the EPG data;
   providing a plurality of user-selectable ratings lock criteria for selection by a user, wherein the plurality of user-selectable ratings lock criteria comprise: a current time at which the request for the EPG display is received, an airing time, a content rating, and a channel identifier;
   receiving a user selection of at least one of the plurality of user-selectable ratings lock criteria and storing the user selection as a ratings lock setting of the television receiver;
   retrieving the ratings lock setting of the television receiver;
   comparing the content rating to the ratings lock setting;
   determining a first criteria regarding the ratings lock setting based on the retrieved ratings lock setting;
   modifying the EPG data, utilizing at least one processing unit of the television receiver, by altering the EPG display information for the at least one record of the plurality of records in either a first manner or a second manner if the content rating exceeds the ratings lock setting, wherein altering in both the first manner and the second manner indicates that the content rating exceeds the ratings lock setting, wherein the EPG display information for the at least one record is modified in the first manner if the first criteria is met and wherein the EPG display information for the at least one record is modified in the second manner if the first criteria is not met;
   generating the EPG display, utilizing the at least one processor of the television receiver, based on the EPG data; and
   transmitting the generated EPG display, utilizing the television receiver, to a display device.

2. The method of claim 1, wherein the EPG display information comprises program information to display for the respective record when generating the EPG display and altering the EPG display information comprises:
   removing at least a portion of the program information from the EPG display information for the at least one record.

3. The method of claim 1, wherein the EPG display information comprises a color in which to display the respective record when generating the EPG display and altering the EPG display information comprises:
   changing the color for the at least one record.

4. The method of claim 1, wherein the EPG display information comprises an intensity for the respective record when generating the EPG display and altering the EPG display information comprises:
   changing the intensity for the at least one record.

5. A system, comprising:
   a communication component operable to receive a programming signal, the programming signal comprising a plurality of programming content and electronic programming guide (EPG) data, the EPG data comprising a plurality of records, each record of the plurality of records comprising a content rating and EPG display information;
   a user interface component operable to receive a request for an EPG display;
   a storage medium operable to store a ratings lock setting; and
   a processing unit, communicably coupled to the communication component, the user interface component, and the storage medium, the processing unit operable to generate the EPG display and transmit the generated EPG display to a display device;

wherein the processing unit provides a plurality of user-selectable ratings lock criteria for selection by a user, wherein the plurality of user-selectable ratings lock criteria comprise: a current time at which the request for the EPG display is received, an airing time, a content rating, and a channel identifier, receives a user selection of at least one of the plurality of user-selectable ratings lock criteria, stores the user selection as the ratings lock setting of the television receiver, retrieves the content rating for at least one record of the plurality of records, retrieves the ratings lock setting, compares the content rating to the ratings lock setting, and modifies the EPG data by altering the EPG display information for the at least one record of the plurality of records when the content rating exceeds the ratings lock setting, and wherein the processing unit determines a first criteria regarding the ratings lock setting based on the retrieved ratings lock setting, and alters the EPG display information for the at least one record in either a first manner or a second manner, wherein altering in both the first manner and the second manner indicates that the content rating exceeds the ratings lock setting, wherein the EPG display for the at least one record is modified in the first manner if the first criteria is met and wherein the EPG display information for the at least one record is modified in the second manner if the first criteria is not met.

6. The system of claim 5, wherein the EPG display information comprises program information to display for the respective record when the EPG display is generated and the processing unit alters the EPG display information for the at least one record by removing at least a portion of the program information from the EPG display information for the at least one record.

7. The system of claim 5, wherein the EPG display information comprises a color in which to display the respective record when the EPG display is generated and the processing unit alters the EPG display information for the at least one record by changing the color for the at least one record.

8. The system of claim 5, wherein the EPG display information comprises an intensity for the respective record when the EPG display is generated and the processing unit alters the EPG display information for the at least one record by changing the visual intensity for the at least one record.

9. The system of claim 5, wherein the display device is communicably coupled to the processing unit.

* * * * *